(12) United States Patent
Guvenc et al.

(10) Patent No.: US 7,577,445 B2
(45) Date of Patent: Aug. 18, 2009

(54) LINE-OF-SIGHT (LOS) OR NON-LOS (NLOS) IDENTIFICATION METHOD USING MULTIPATH CHANNEL STATISTICS

(75) Inventors: Ismail Guvenc, Santa Clara, CA (US); Chia-Chin Chong, Santa Clara, CA (US)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/832,551

(22) Filed: Aug. 1, 2007

(65) Prior Publication Data

US 2008/0032709 A1 Feb. 7, 2008

Related U.S. Application Data

(60) Provisional application No. 60/822,127, filed on Aug. 11, 2006, provisional application No. 60/821,378, filed on Aug. 3, 2006.

(51) Int. Cl.
*H04Q 7/20* (2006.01)
(52) U.S. Cl. ............... 455/456.2; 455/456.5; 455/506; 455/67.11; 455/67.16
(58) Field of Classification Search ............... 455/456.1, 455/456.2, 226.1, 422.1, 404.2, 67.11, 67.16, 455/115.1, 506, 456.5
See application file for complete search history.

(56) References Cited

U.S. PATENT DOCUMENTS

| | | | |
|---|---|---|---|
| 5,058,200 A * | 10/1991 | Huang et al. | 455/456.2 |
| 5,644,572 A | 7/1997 | Olds et al. | |
| 5,754,950 A * | 5/1998 | Petersson et al. | 455/273 |
| 7,065,368 B2 | 6/2006 | You et al. | |
| 2004/0110514 A1* | 6/2004 | Kim et al. | 455/456.1 |
| 2006/0046659 A1* | 3/2006 | Haartsen et al. | 455/67.11 |

FOREIGN PATENT DOCUMENTS

EP  1 469 685  10/2004

OTHER PUBLICATIONS

B. Alavi and K. Pahlavan, "Analysis of undetected direct path in time of arrival based UWB indoor geolocation," in *Proc. IEEE Vehic. Technol. Conf. (VTC)*, vol. 4, Dallas, TX, Sep. 2005, pp. 2627-2631.
I. Guvenc, Z. Sahinoglu, A. F. Molisch, and P. Orlik, "Non-coherent TOA estimation in IR-UWB systems with different signal waveforms," in *in Proc. IEEE Int. Workshop on Ultrawideband Networks (UWBNETS)*, Boston MA, Oct. 2005, pp. 245-251, (invited paper).

(Continued)

*Primary Examiner*—Temica M Beamer
(74) *Attorney, Agent, or Firm*—Haynes and Boone, LLP

(57) ABSTRACT

Non-line-of-sight (NLOS) identification and mitigation are carried out in a wireless positioning system based on channel statistics derived from multipath components of a received signal. The statistics may be based on the kurtosis, the mean excess delay spread, or the root mean square delay spread. The results are justified using IEEE 802.15.4a ultrawideband channel models. Amplitude and delay statistics based on the IEEE models are shown to be log-normal random variables. A joint likelihood ratio test is presented for the LOS and NLOS identification.

13 Claims, 3 Drawing Sheets

OTHER PUBLICATIONS

D. Dardari, C. C. Chong, and M. Z. Win, "Analysis of threshold-based TOA estimators in UWB channels," *14th European Signal Processing Conference (EUSIPCO 2006)*, Florence, Italy, Sep. 2006, (Invited Paper).

D. Dardari, C. C. Chong and M. Z. Win, "Improved lower bounds on time of arrival estimation error in UWB realistic channels," *IEEE Intl. Conf. on Ultra-Wideband (ICUWB 2006)*, Waltham, MA, USA, Sep. 2006 (Invited Paper).

M. P. Wylie and J. Holtzman, "The non-line of sight problem in mobile location estimation," in *Proc. IEEE Int. Conf. Universal Personal Commun.*, Cambridge, MA, Sep. 1996, pp. 827-831.

J. Borras, P. Hatrack, and N. B. Mandayam, "Decision theoretic framework for NLOS identification," in *Proc. IEEE Vehicular Technol. Conf. (VTC)*, vol. 2, Ontario, Canada, May 1998, pp. 1583-1587.

S. Gezici, H. Kobayashi, and H. V. Poor, "Non-parametric non-line-ofsight identification," in *Proc. IEEE Vehic. Technol. Conf. (VTC)*, vol. 4, Orlando, FL, Oct. 2003, pp. 2544-2548.

A. Rabbachin, I. Oppermann, and B. Denis, "ML time-of-arrival estimation based on low complexity UWB energy detection," in *Proc. IEEE Int. Conf. Ultrawideband (ICUWB)*, Waltham, MA, Sep. 2006.

P. C. Chen, "A non-line-of-sight error mitigation algorithm in location estimation," in *Proc. IEEE Int. Conf. Wireless Commun. Networking (WCNC)*, vol. 1, New Orleans, LA, Sep. 1999, pp. 316-320.

R. Casas, A. Marco, J. J. Guerrero, and J. Falco, "Robust estimator for non-line-of-sight error mitigation in indoor localization," *Eurasip J. Applied Sig. Processing*, pp. 1-8, 2006.

Y. T. Chan, W. Y. Tsui, H. C. So, and P. C. Ching, "Time-of-arrival based localization under NLOS conditions," *IEEE Trans. Vehic. Technol.*, vol. 55, No. 1, pp. 17-24, Jan. 2006.

B. Li, A. G. Dempster, and C. Rizos, "A database method to mitigate the NLOS error in mobile phone positioning," in *Proc. IEEE Position Location and Navigation Symposium (PLBSS)*, San Diego, CA, Apr. 2006.

X. Li, "An interative NLOS mitigation algorithm for location estimation in sensor networks," in *Proc. IST Mobile and Wireless Commun. Summit*, Myconos, Greece, Jun. 2006.

L. Cong and W. Zhuang, "Non-line-of-sight error mitigation in mobile location," in *Proc. IEEE INFOCOM*, Hong Kong, Mar. 2004, pp. 650-659.

J. Riba and A. Urruela, "A non-line-of-sight mitigation technique based on ML-detection," in *Proc. IEEE Int. Conf. Acoustics, Speech, and Signal Processing (ICASSP)*, vol. 2, Quebec, Canada, May 2004, pp. 153-156.

S. Venkatesh and R. M. Buehrer, "A linear programming approach to NLOS error mitigation in sensor networks," in *Proc. IEEE IPSN*, Nashville, Tennessee, Apr. 2006.

C. L. Chen and K. T. Feng, "An efficient geometry-constrained location estimation algorithm for NLOS environments," in *Proc. IEEE Int. Conf. Wireless Networks, Commun., Mobile Computing*, Hawaii, USA, Jun. 2005, pp. 244-249.

X. Wang, Z. Wang, and B. O. Dea, "A TOA based location algorithm reducing the errors due to non-line-of-sight (NLOS) propagation," *IEEE Trans. Vehic. Technol.*, vol. 52, No. 1, pp. 112-116, Jan. 2003.

"Nist/sematech e-handbook of statistical methods," 2006. [Online]. Available: http://www.6sigma.us/handbook/eda/section3/eda35b/htm.

PCT International Search Report for International Application No. PCT/US2007/075087; 3 pages.

PCT Written Opinion of the International Searching Authority for International Application No. PCT/US2007/075087; 4 pages.

\* cited by examiner

LINE-OF-SIGHT (LOS) OR NON-LOS (NLOS) IDENTIFICATION METHOD USING MULTIPATH CHANNEL STATISTICS

CROSS REFERENCE TO RELATED APPLICATIONS

The present application is related to and claims priority of copending U.S. Provisional Patent Applications (collectively "Copending Provisional Applications"), (a) Ser. No. 60/821,378, entitled "Iterative Method that Jointly Estimates the Time-of-Arrival of the Received Signals and the Terminal Location," filed on Aug. 3, 2006; and (b) Ser. No. 60/822,127, entitled "Line-of-Sight (LOS) or non-LOS (NLOS) Identification Method Using Multipath Channel Statistics," filed on Aug. 11, 2006.

The present application is also copending U.S. patent applications (collectively, "Related Applications") (a) Ser. No. 11/832,547, entitled "Method for Estimating Jointly Times-of-Arrival of Signals and the Terminal Location," filed on the same day as the present application, and (b) Ser. No. 11/832,558, entitled "Weighted Least Square Localization Method Exploiting Multipath Channel Statistics for Non-Line-of-Sight Mitigation," filed on the same day as the present application.

The disclosures of the Copending Provisional Applications and the Related Applications are hereby incorporated by reference in their entireties.

BACKGROUND OF THE INVENTION

1. Field of the Invention

The present invention relates to wireless localization and communications technology. More specifically, the present invention is applicable to improving localization accuracy and communications performance in wireless communication systems.

2. Discussion of the Related Art

Because of its very wide bandwidth, ultra-wideband (UWB) technology promises accurate ranging and localization systems capable of resolving individual multipath components (MPCs). Using UWB technology, the time-of-arrival (TOA) of the received signal can be estimated with high accuracy when the first arriving path can be correctly identified. Various systems using UWB technology have been disclosed, including those disclosed in the articles: (a) "Analysis of undetected direct path in time of arrival based UWB indoor geolocation," by B. Alavi and K. Pahlavan, published in *Proc. IEEE Vehic. Technol. Conf. (VTC)*, vol. 4, Dallas, Tex., September 2005, pp. 2627-2631; (b) "Non-coherent TOA estimation in IR-UWB systems with different signal waveforms," by I. Guvenc, Z. Sahinoglu, A. F. Molisch, and P. Orlik, published in *in Proc. IEEE Int. Workshop on Ultrawideband Networks (UWBNETS)*, Boston, Mass., October 2005, pp. 245-251, (invited paper); (c) "Analysis of threshold-based TOA estimators in UWB channels," by D. Dardari, C. C. Chong, and M. Z. Win, published in the 14*th European Signal Processing Conference (EUSIPCO* 2006), Florence, Italy, September 2006, (Invited Paper); and (d) "Improved lower bounds on time of arrival estimation error in UWB realistic channels," by D. Dardari, C. C. Chong and M. Z. Win, published in *IEEE Intl. Conf. on Ultra-Wideband (ICUWB* 2006), Waltham, Mass., USA, September 2006 (Invited Paper).

One challenge for a localization system is to successfully mitigate non-line-of-sight (NLOS) effects. When the direct path between an anchor node (AN) and a mobile terminal is obstructed, the TOA of the signal to the AN is delayed, which introduces a positive bias. NLOS TOA estimates adversely affect localization accuracy. Hence, prior art cellular networks typically identify the ANs that are under NLOS conditions and mitigate their effects. For example, the article "The non-line of sight problem in mobile location estimation," by M. P. Wylie and J. Holtzman, published in *Proc. IEEE Int. Conf. Universal Personal Commun.*, Cambridge, Mass., September 1996, pp. 827-831, teaches comparing the standard deviation of range measurements to a threshold for NLOS signal identification, when the measurement noise variance is known. Similarly, the article "Decision theoretic framework for NLOS identification," by J. Borras, P. Hatrack, and N. B. Mandayam, "published in *Proc. IEEE Vehicular Technol. Conf. (VTC)*, vol. 2, Ontario, Canada, May 1998, pp. 1583-1587, discloses a decision-theoretic NLOS identification framework using various hypothesis tests for known and unknown probability density functions (PDFs) of the TOA measurements.

The article "Non-parametric non-line-of-sight identification," by S. Gezici, H. Kobayashi, and H. V. Poor, published in *Proc. IEEE Vehic. Technol. Conf. (VTC)*, vol. 4, Orlando, Fla., October 2003, pp. 2544-2548, discloses a non-parametric NLOS identification approach, which allows the probability density functions of the TOA measurements to be approximated. A suitable distance metric is used between the known measurement noise distribution and the non-parametrically estimated measurement distribution.

These prior art NLOS identification techniques all assume that the TOA measurements for NLOS base stations (BSs) change over time. Such an assumption is reasonable for a moving terminal, for which the TOA measurements have a larger variance. However, when the terminal is static (e.g., in wireless personal area network (WPAN) applications), the distribution of the NLOS measurements may show little deviation from the distribution under LOS condition. There, the multipath characteristics of the received signal provide insight useful for LOS/NLOS identification. For example, European Patent Application Publication EP 1,469,685, entitled "A method distinguishing line of sight (LOS) from non-line-of-sight (NLOS) in CDMA mobile communication system," by X. Diao and F. Guo, filed on Mar. 29, 2003, published on Oct. 20, 2004, discloses that a received code division multiple access (CDMA) signal is LOS if: 1) the power ratio of the global maximum path to the local maximum path is greater than a given threshold, and 2) the arrival time difference between the first path and the maximum path is less than a given time interval. Similarly, the article "ML time-of-arrival estimation based on low complexity UWB energy detection," by Rabbachin, I. Oppermann, and B. Denis, published in *Proc. IEEE Int. Conf. Ultrawideband (ICUWB)*, Waltham, Mass., September 2006, discloses that the NLOS identification for UWB systems may be performed by comparing the normalized strongest path with a fixed threshold. In either scheme, judicious parameter selection (e.g., the threshold or the time interval) is essential.

As an alternative to identifying NLOS conditions from the received multipath signal, information derived from the overall mobile network may be used to mitigate NLOS conditions. For example, the article "A non-line-of-sight error mitigation algorithm in location estimation," by P. C. Chen, published in *Proc. IEEE Int. Conf. Wireless Commun. Networking (WCNC)*, vol. 1, New Orleans, La., September 1999, pp. 316-320, discloses a residual-based algorithm for NLOS mitigation. That algorithm is based on three or more available base stations, using location estimates and residuals for different combinations of base stations. (When all the nodes are LOS, three base stations are required to perform a two-dimensional (2-D) localization, while four base stations are required to perform a 3-dimensional (3-D) localization.) The location estimates with smaller residuals are more likely to represent the correct terminal location. Hence, the technique disclosed in the article weights the different location estimates inversely with to the corresponding residuals.

Other NLOS mitigation techniques using information derived from the mobile network are disclosed in (a) "Robust estimator for non-line-of-sight error mitigation in indoor localization," by R. Casas, A. Marco, J. J. Guerrero, and J. Falco, published in *Eurasip J. Applied Sig. Processing*, pp. 1-8, 2006; (b) "Time-of-arrival based localization under NLOS conditions," by Y. T. Chan, W. Y. Tsui, H. C. So, and P. C. Ching, published in *IEEE Trans. Vehic. Technol.*, vol. 55, no. 1, pp. 17-24, January 2006; (c) "A database method to mitigate the NLOS error in mobile phone positioning," by B. Li, A. G. Dempster, and C. Rizos, published in *Proc. IEEE Position Location and Navigation Symposium (PLANS)*, San Diego, Calif., April 2006; (d) "An iterative NLOS mitigation algorithm for location estimation in sensor networks," by X. Li, published in *Proc. IST Mobile and Wireless Commun. Summit*, Myconos, Greece, June 2006; (e) "Non-line-of-sight error mitigation in mobile location," by L. Cong and W. Zhuang, published in *Proc. IEEE INFOCOM*, Hong Kong, March 2004, pp. 650-659; (f) "A non-line-of-sight mitigation technique based on ML-detection," by J. Riba and A. Urruela, published in *Proc. IEEE Int. Conf. Acoustics, Speech, and Signal Processing (ICASSP)*, vol. 2, Quebec, Canada, May 2004, pp. 153-156; (g) "A linear programming approach to NLOS error mitigation in sensor networks," by S. Venkatesh and R. M. Buehrer, published in *Proc. IEEE IPSN*, Nashville, Tenn., April 2006; (h) "An efficient geometry-constrained location estimation algorithm for NLOS environments," by C. L. Chen and K. T. Feng, published in *Proc. IEEE Int. Conf. Wireless Networks, Commun., Mobile Computing*, Hawaii, USA, June 2005, pp. 244-249; and (i) "A TOA based location algorithm reducing the errors due to non-line-of-sight (NLOS) propagation," by X. Wang, Z. Wang, and B. O. Dea, published in *IEEE Trans. Vehic. Technol.*, vol. 52, no. 1, pp. 112-116, January 2003.

However, some of these NLOS mitigation and identification techniques use only information from the mobile network, and do not take advantage of information in the received signal. Other techniques which take into consideration statistics of the measured distances require the distance measurements to be recorded. Typically, a large number of real-time measurements are required for an accurate characterization of LOS and NLOS conditions. Also, under these techniques, the NLOS conditions can be identified only when the terminal is mobile, thus allowing the measured NLOS bias to show a variation.

European Patent Application Publication EP 1,469,685 discloses a method that uses the multipath components of the received signal in a CDMA system. This technique takes advantage only of the delay information in the strongest path, and the ratio between the global and local maximum paths. The technique relies on appropriately selecting thresholds for these parameters.

One use of channel statistics in LOS/NLOS identification of UWB signals is briefly discussed in the article "ML time-of-arrival estimation based on low complexity UWB energy detection," by Rabbachin et al., discussed above. The Rabbachin article compares a (normalized) strongest path with a threshold for LOS/NLOS identification. Rabbachin's technique requires accurately determining an optimal threshold, and does not take advantage of the information in the received signal, except for the information in the strongest path.

SUMMARY OF THE INVENTION

The present invention provides a NLOS identification technique based on amplitude and delay statistics of an UWB channel. According to one embodiment of the present invention, amplitude and delay statistics for a received signal are captured using the kurtosis of the received signal, the mean excess delay spread and the root mean square (RMS) delay spread of the received multipath components of the received signal. Probability density functions of each of these metrics are justified by application to the IEEE 802.15.4a UWB channels and are found to be appropriately modeled by log-normal random variables. A joint likelihood ratio test selects between the LOS and NLOS hypotheses of the received signal. Given the PDFs of LOS and NLOS conditions (e.g., from previous measurements), the methods of the present invention do not require a large number of measurements.

In one embodiment, the amplitude and delay statistics are assumed to be independent to simplify the likelihood function calculation used in hypothesis testing.

The present invention is better understood upon consideration of the detailed description below, in conjunction with the accompanying drawings.

DETAILED DESCRIPTION OF THE PREFERRED EMBODIMENTS

Figure 1A:
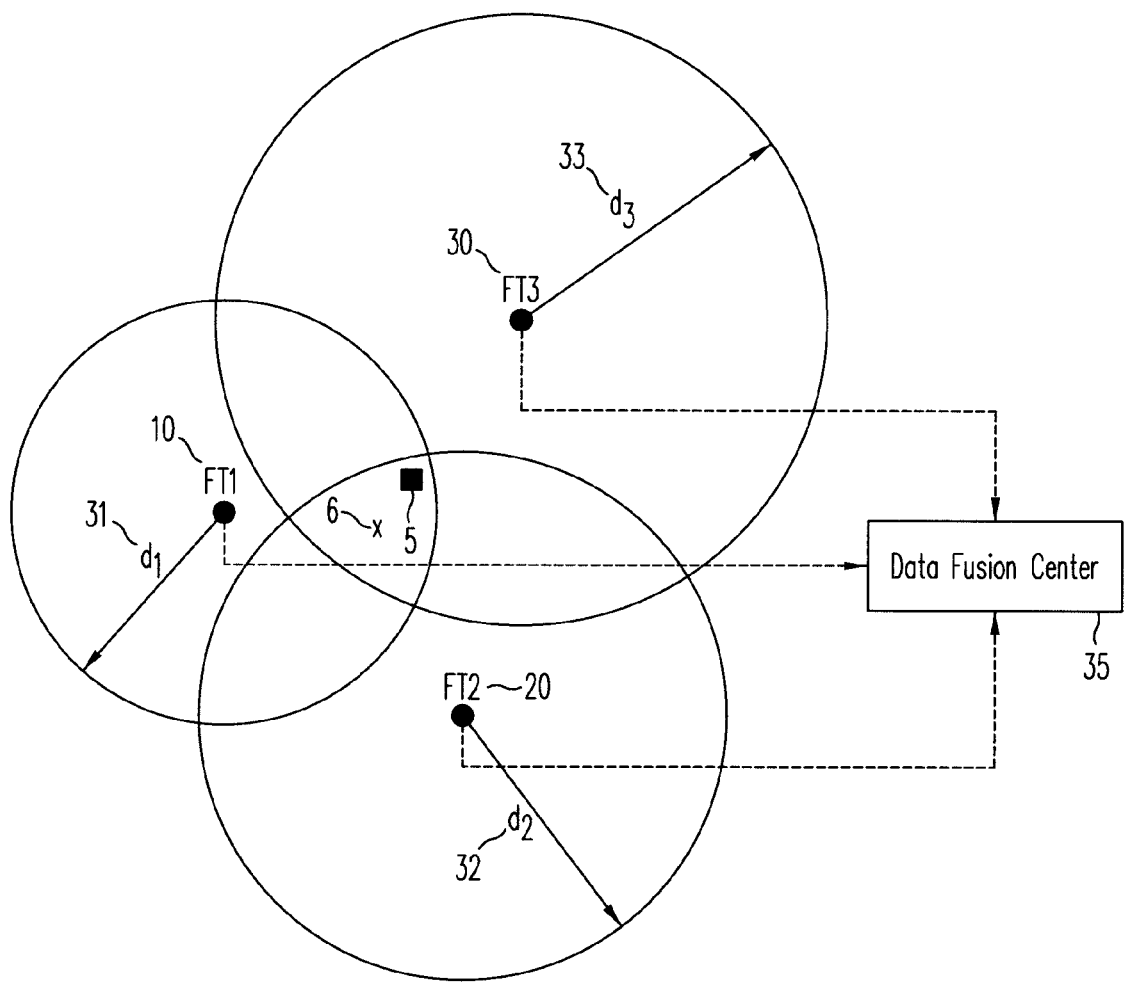
FIG. 1(a) illustrates triangulation using on a time-of-arrival (TOA) technique in a wireless network under a NLOS condition, based on measurements at base stations 10, 20 and 30.

According to one embodiment of the present invention, a channel impulse response (CIR) h(t) of a received signal may be represented by:

$$h(t) = \sum_{l=1}^{L} \gamma_l \delta(t - \tau_l)$$

where L is the total number of MPCs, and $\gamma_l$ and $\tau_l$ are the amplitude and delay of the $l^{th}$ MPC, respectively. The TOA of the received signal is given by $\tau_{toa} = \tau_1$ (i.e., the arrival time for first arriving path). Hypotheses $H_0$ and $H_1$, representing respectively the LOS hypothesis and the NLOS hypothesis, are given by:

$$\begin{cases} H_0: & d/c = \tau_1, \\ H_1: & d/c < \tau_1, \end{cases}$$

Where d denotes the actual distance between a fixed terminal (FT)[1] and a mobile terminal, and c denotes the speed of light.

Under a NLOS condition, even when the first arriving path is correctly identified, the TOA estimate still yields a larger value as compared to the actual distance. Thus, NLOS FTs are identified and their effects are mitigated to avoid degradation of localization performance.

[1] A fixed terminal is a terminal which is non-moving relative to a mobile terminal. Examples of a fixed terminal include base stations in a cellular or wireless network and anchor nodes in a sensor network.

The present invention provides a method that uses statistics of the received multipath components to distinguish between LOS and NLOS conditions. In one embodiment, statistical data that capture the amplitude and the delay of the received signal (namely, the kurtosis, the mean excess delay, and the RMS delay spread) are used to distinguish between LOS and NLOS conditions.

The kurtosis is the ratio between the fourth order moment of a random variable to the square of its second order moment (i.e., the variance). According to "NIST/Sematech e-handbook of Statistical Methods," 2006 (available online at www.6sigma.us) the kurtosis is defined as "a measure of whether the data are peaked or flat relative to a normal distribution; i.e., data sets with high kurtosis tend to have a distinct peak near the mean, decline rather rapidly, and have heavy tails, while data sets with low kurtosis tend to have a flat top near the mean rather than a sharp peak". Since the kurtosis characterizes how peaked a data is, the kurtosis also characterizes how strong the LOS condition at a multipath CIR. The received signal is more likely to be from a LOS source for a CIR with a high kurtosis value.

For a channel with a CIR h(t), the kurtosis of |h(t)| is given by:

$$\kappa = \frac{E[(|h(t)| - \mu_{|h|})^4]}{E[(|h(t)| - \mu_{|h|})^2]^2} = \frac{E[(|h(t)| - \mu_{|h|})^4]}{\sigma_{|h|}^4},$$

where $\mu_{|h|}$ and $\sigma_{|h|}$ are the mean and the standard deviation of the absolute value of the CIR, respectively. The distribution of $\kappa$ can be obtained for both LOS and NLOS conditions using sample channel realizations. For example, the IEEE 802.15.4a channels provide histograms of $\kappa$ for eight different channel models (i.e., CM1 to CM8), corresponding to indoor residential LOS and NLOS conditions, indoor office LOS and NLOS conditions, outdoor LOS and NLOS conditions, and industrial LOS and NLOS conditions, respectively. The histograms may each be modeled by a log-normal PDF given by:

$$p(\kappa) = \frac{1}{\kappa\sqrt{2\pi}\,\sigma}\exp\left[-\frac{(\ln(\kappa) - \mu_\kappa)^2}{2\sigma_\kappa^2}\right],$$

where $\mu_\kappa$ is the mean and $\sigma_\kappa$ is the standard deviation of p($\kappa$). This model is justified using the Kolmogorov-Smirnov (KS) goodness-of-fit hypothesis test at 5% significance level on the IEEE 802.15.4a channels.

While the kurtosis provides information about the amplitude statistics of the received MPCs, the delay statistics of the multipath components are provided by the mean excess delay and the RMS delay spread. According to the "*Wireless Communications: Principles and Practice*", T. S. Rappaport (author), Indianapolis, Ind.: Prentice Hall, 2002, the mean excess delay, $\tau_m$, of a channel is given by:

$$\tau_m = \frac{\int_{-\infty}^{\infty} t|h(t)|^2 dt}{\int_{-\infty}^{\infty} |h(t)|^2 dt}.$$

and the RMS delay spread, $\tau_{rms}$, is given by:

$$\tau_{rms} = \frac{\int_{-\infty}^{\infty} (t - \tau_m)^2 |h(t)|^2 dt}{\int_{-\infty}^{\infty} |h(t)|^2 dt}.$$

Similar to the kurtosis analysis discussed above, the histograms of the mean excess delay and RMS delay spread for the eight different channel models from IEEE 802.15.4a justify the assumed log-normal distribution of delay in the received signal, based on the KS test at the 5% significance level.

If à priori knowledge of the statistics for $\kappa$, $\tau_m$, and $\tau_{rms}$ are available under the LOS and NLOS conditions, likelihood ratio tests can be set up to distinguish between the LOS and NLOS hypotheses. For example, let $p_{los}(\chi)$ and $p_{nlos}(\chi)$ represent the PDFs corresponding to LOS and NLOS conditions, respectively, and let $\kappa$, $\tau_m$, and $\tau_{rms}$ represent the kurtosis, mean excess delay, and RMS delay spread for an observed channel realization h(t), respectively, the following three likelihood ratio tests can each be used to identify LOS/NLOS conditions:

1) Kurtosis Test:

$$\frac{P_{los}^{kurt}(\kappa)}{P_{nlos}^{kurt}(\kappa)} \underset{NLOS}{\overset{LOS}{\gtrless}} 1,$$

2) Mean Excess Delay Test:

$$\frac{P_{los}^{med}(\tau_m)}{P_{nlos}^{med}(\tau_m)} \underset{NLOS}{\overset{LOS}{\gtrless}} 1,$$

3) RMS Delay Spread Test:

$$\frac{P_{los}^{rms-ds}(\tau_{rms})}{P_{nlos}^{rms-ds}(\tau_{rms})} \underset{NLOS}{\overset{LOS}{\gtrless}} 1,$$

In each test, the LOS hypothesis ($H_0$) is selected when the likelihood ratio is greater than 1; otherwise, the NLOS hypothesis ($H_1$) is selected. To take into account all the parameters, using joint PDFs for these parameters, a test of the form may be obtained:

$$\frac{P_{los}^{joint}(\kappa, \tau_m, \tau_{rms})}{P_{nlos}^{joint}(\kappa, \tau_m, \tau_{rms})} \underset{NLOS}{\overset{LOS}{\gtrless}} 1.$$

Joint PDFs are, however, difficult to derive. One simplification may be obtained by assuming $\kappa$, $\tau_m$, and $\tau_{rms}$ to be independent:

$$J(\kappa, \tau_m, \tau_{rms}) \underset{NLOS}{\overset{LOS}{\gtrless}} 1,$$

where $$J(\kappa, \tau_m, \tau_{rms}) = \frac{P_{los}^{kurt}(\kappa)}{P_{nlos}^{kurt}(\kappa)} \times \frac{P_{los}^{med}(\tau_m)}{P_{nlos}^{med}(\tau_m)} \times \frac{P_{los}^{rms}(\tau_{rms})}{P_{nlos}^{rms}(\tau_{rms})}.$$

FIG. 1(a) illustrates triangulation using on a TOA technique in a wireless network under a NLOS condition, based on measurements at FTs 10, 20 and 30. In this system, each FT measures the TOA of the signal received from mobile terminal 5. The measurements are then forwarded to a centralized processing station 35. Alternatively, mobile terminal 5 may directly estimate its location using the received signals from all the FTs.

Figure 1B:
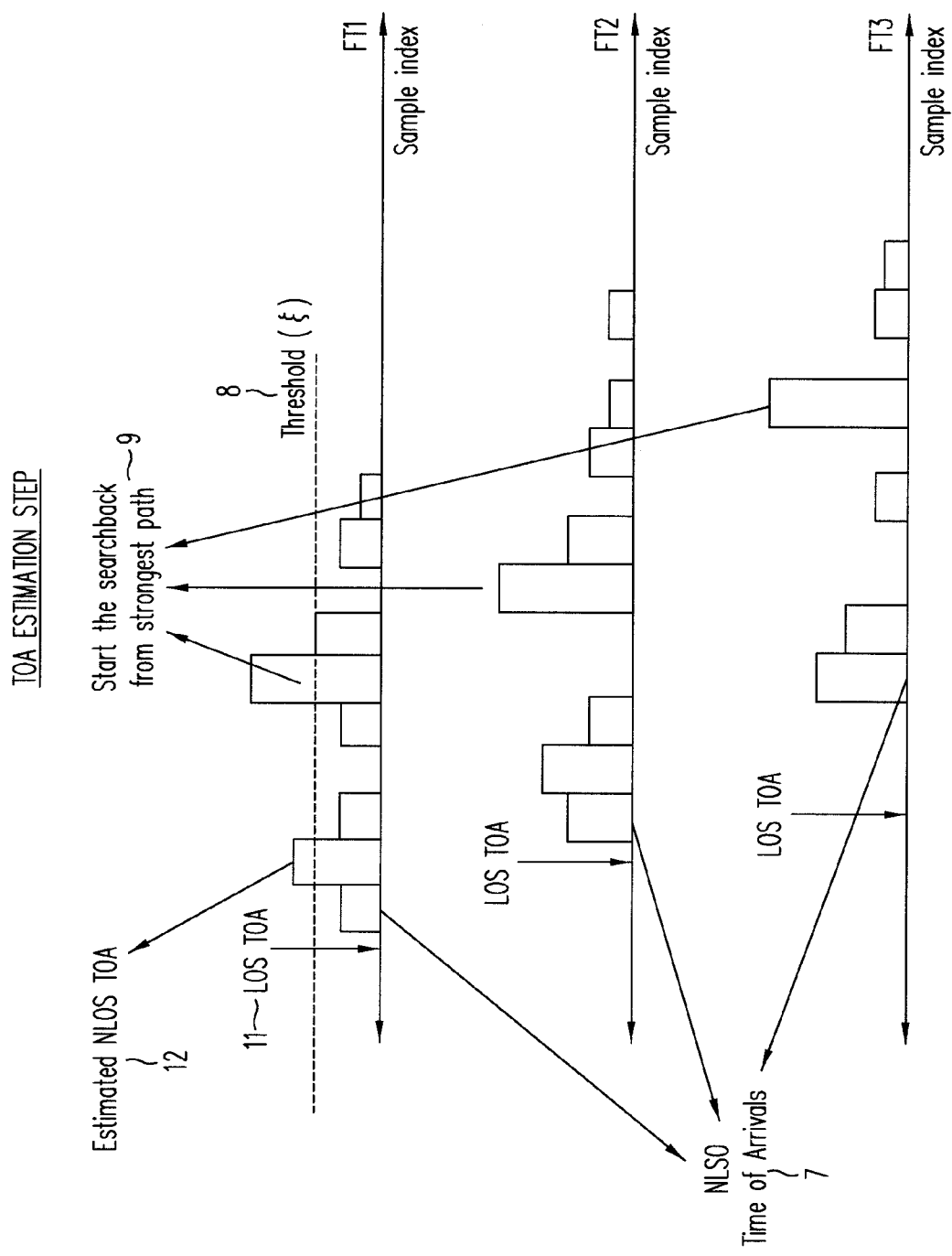
FIG. 1(b) illustrates processing of received signals at base stations 10, 20 and 30 of FIG. 1(a).

FIG. 1(b) illustrates processing of received signals at FTs 10, 20 and 30 of FIG. 1(a). The FT receiver first identifies strongest path 9, from which time the receiver searches backwards for first arriving path 7. Under a LOS condition, first arriving path 7 represents an actual distance between the transmitter and the receiver. However, under NLOS condition (i.e., an obstruction exists between the transmitter and the receiver), first arriving paths 7 arrives at a later time than LOS first arriving paths 11. Thus, a positive bias is included in the TOA estimate under a NLOS condition, even if the first arriving path is correctly identified. As shown in FIG. 1(b), as threshold 8 is used to qualify the first arriving path, first arriving path 12 is actually be later in time than actual NLOS first arriving path 7.

In a conventional system, the TOA of the received signal is estimated at each FT using arbitrary thresholds. The TOA estimates can be easily converted to distance estimates 31, 32 and 33 (FIG. 1(a)), which may then be used to estimate the terminal location by minimizing the residual under a least-squares approach:

$$\hat{x} = \underset{x}{\operatorname{argmin}} \sum_{i=1}^{N} [d_i - \|x - x_i\|]^2,$$

where $d_i$ is the distance between the ith FT and the terminal and $x_i$ is the known location of the ith FT, for N available FTs. The mean square residual error ("residual") for the estimated terminal location is provided by:

$$\text{Residual} = \frac{1}{N} \sum_{i=1}^{N} [d_i - \|\hat{x} - x_i\|]^2.$$

Under a LOS condition, the residual depends only on both measurement noise and search-back errors. Search-back errors result from inaccurate identification of the first arriving path. Under a LOS condition, the leading edge is easily identified and an accurate estimate of the TOA can be made for each FT. Therefore, under a LOS condition, the estimated mobile terminal location is close to the actual mobile terminal location, and the residual is typically small, assuming sufficient averaging reduces noise variance.

Under a NLOS condition (i.e., one or more NLOS FTs), the residual is considerably large due to the NLOS bias introduced. As discussed above, the NLOS bias result from: 1) the delay between the LOS TOA and NLOS TOA, and 2) the delay between the estimated NLOS TOA and actual NLOS TOA. The first type of bias may be handled in the triangulation step, rather than the search-back step. The LOS or NLOS information of the channel may be obtained from the multipath received signals (e.g., in the form of a likelihood weight) and be used in the triangulation step and as a termination condition for the search-back for LOS FTs.

Figure 2:
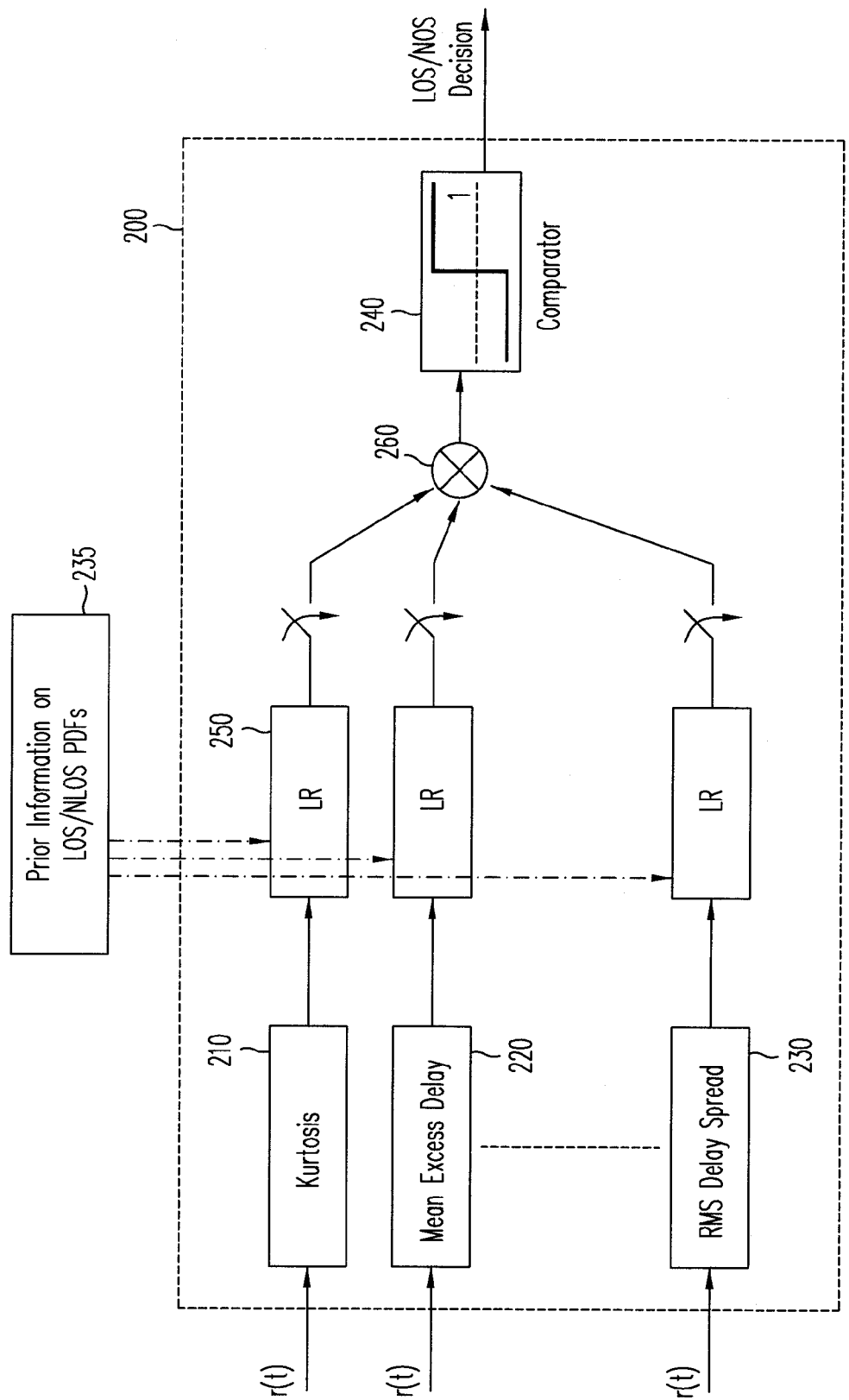
FIG. 2 illustrates identifying LOS or NLOS conditions using kurtosis 210, mean excess delay 220, and the RMS delay spread 230 from the received signal, in accordance with one embodiment of the present invention.

FIG. 2 illustrates identifying LOS or NLOS conditions using kurtosis 210, mean excess delay 220, or the RMS delay spread 230 from the received signal, in accordance with one embodiment of the present invention. As shown in FIG. 2, kurtosis 210, mean excess delay 220, or the RMS delay spread 230 are calculated from the received signal in the manner described above. Then, using the prior information 235 of the PDFs for these parameters in LOS and NLOS conditions, the likelihood ratio (LR) 250 for each parameter is calculated. As discussed above, using the simplified model, in which kurtosis 210, mean excess delay 220, and RMS delay spread 230 are assumed to be independent, their respective LRs are multiplied to obtain joint LR 260. (One may select to discard any of the LRs while calculating the product 260 of the LRs). Joint LR 260 is then compared at step 240 to determine whether the signal is LOS or NLOS 240. Within the scope of the present invention, other statistics of the received signal may also be used (e.g., energy of the strongest path, or energy of the signal earlier in time than the strongest path).

As discussed above, prior art solutions for NLOS identification from the received signal typically require recording of the TOA (or distance) measurements over time. In contrast, the methods according to the present invention do not require a time-history of the measurements, and identification can be performed even using a single channel realization (so long as LOS/NLOS likelihood PDFs are available), as the variations in the TOA is not taken into account. Instead, the NLOS information in the received MPCs is used. The present invention is applicable in numerous ways for improving localization accuracy. NLOS FTs identified by the techniques of the present invention can be eliminated from consideration to avoid the biases of the NLOS FTs to be incorporated into the location estimate. In situations where the number of available FTs is limited in the network, so that measurements cannot simply be discarded, the likelihood functions of LOS FTs can be used as weights in the LS localization algorithm, to minimize the effects of NLOS measurements.

LOS/NLOS information identified under the present invention is also applicable for improving symbol detection performance. For example, the LOS/NLOS information may be used for selecting the number of Rake fingers to use (e.g., in matched-filter receivers). Alternatively, the integration interval (e.g., in transmitted reference or in energy detector receivers) may decrease the bit error rate of the receiver at a given signal-to-noise ratio.

The above detailed description is provided to illustrate specific embodiments of the present invention and is not intended to be limiting. Numerous modifications and variations within the scope of the present invention are possible. The present invention is set forth in the following claims.

We claim:

1. A method for identifying line-of-sight (LOS) and non-line-of-sight (NLOS) conditions in a received ultra-wideband signal, comprising:

calculating a statistical quantity of the received signal based on delays and amplitudes of one or more multipath components of the received signal;

setting up a hypothesis test based on the probability density functions of the statistical quantity for the LOS and NLOS conditions; and applying the calculated statistical quantity to the hypothesis test to determine whether the received signal is LOS or NLOS.

2. A method as in claim 1, wherein the statistical quantity is a function of the kurtosis of the received signal.

3. A method as in claim 1, wherein the statistical quantity is a function of the mean excess delay of the received signal.

4. A method as in claim 1, wherein the statistical quantity is a function of the root-mean-square delay spread of the received signal.

5. A method as in claim 1, wherein the probability density functions are each a log-normal probability density function.

6. A method as in claim 1, wherein the statistical quantity is a joint function of two or more of the following parameters: the kurtosis, the mean excess delay, and the root-mean-square delay spread of the received signal.

7. A method as in claim 1, wherein the probability density functions for the LOS and the NLOS conditions are the joint probability density functions of the parameters for the corresponding conditions.

8. A method as in claim 7, wherein the joint probability density function is derived by assuming the included parameters are independent.

9. A method as in claim 1, wherein the hypothesis test is based on a likelihood ratio.

10. A method as in claim 1, wherein the statistical quantity is a function of a signal component of the received signal associated with the strongest path.

11. A method as in claim 1, wherein the statistical quantity is a function of a signal component of the received signal associated with a path weaker than the strongest path.

12. A method for localizing a terminal position, based on the method for identifying LOS and NLOS conditions of claim 1, comprising:

Identifying NLOS conditions in the received signal based on the method for identifying; and minimizing the effects of the NLOS conditions by providing appropriate weights to identified NLOS components in the received signal.

13. A method as in claim 12, wherein the appropriate weight to an identified NLOS component is zero.

* * * * *